US010052751B2

(12) United States Patent
Sampaio

(10) Patent No.: US 10,052,751 B2
(45) Date of Patent: Aug. 21, 2018

(54) HEIGHT ADJUSTMENT LOCK SYSTEM

(71) Applicant: Casabella Holdings L.L.C., Congers, NY (US)

(72) Inventor: Andre Sampaio, Valley Cottage, NY (US)

(73) Assignee: Bradshaw International, Inc., Rancho Cucamonga, CA (US)

( * ) Notice: Subject to any disclaimer, the term of this patent is extended or adjusted under 35 U.S.C. 154(b) by 389 days.

(21) Appl. No.: 14/660,644

(22) Filed: Mar. 17, 2015

(65) Prior Publication Data

US 2016/0271784 A1 Sep. 22, 2016
US 2018/0043522 A9 Feb. 15, 2018

Related U.S. Application Data

(60) Provisional application No. 61/953,569, filed on Mar. 14, 2014.

(51) Int. Cl.

*F16M 11/14* (2006.01)
*B25G 1/04* (2006.01)
*A47L 13/10* (2006.01)

(52) U.S. Cl.

CPC ................ *B25G 1/04* (2013.01); *A47L 13/10* (2013.01)

(58) Field of Classification Search

CPC ... A47L 13/20; B25G 1/04; F16B 7/10; F16B 7/14; F16B 7/1454; Y10T 403/32501; Y10T 403/32532

See application file for complete search history.

(56) References Cited

U.S. PATENT DOCUMENTS

| | | | | | |
|---|---|---|---|---|---|
| 6,142,699 | A * | 11/2000 | Pao | F16B 7/1454 | 403/109.5 |
| 6,562,276 | B1 * | 5/2003 | Shelby | B29C 45/16 | 264/328.8 |
| 7,802,340 | B2 * | 9/2010 | Knopow | A47L 13/24 | 15/144.1 |
| 2013/0281224 | A1 * | 10/2013 | Zabala Scharpp | A63B 53/02 | 473/288 |

FOREIGN PATENT DOCUMENTS

CN 203712653 U * 7/2014

* cited by examiner

*Primary Examiner* — Shay Karls
(74) *Attorney, Agent, or Firm* — Curtis, Mallet-Prevost, Colt & Mosle, LLP

(57) ABSTRACT

A height adjustment lock system is disclosed. The system allows one to easily adjust the length of a pole or a handle. Such adjustment is useful with cleaning and maintenance devices as well as with tools and other implements. The height adjustment lock system has a locking handle that is movably attached to a braking cylinder. A multi section pole or handle is engaged with the braking cylinder. Movement of the locking handle causes the braking cylinder to frictionally retain the sections in a selected position, and further movement of the locking handle in an opposing direction causes the braking cylinder to release the sections for further height or length adjustment.

20 Claims, 9 Drawing Sheets

HEIGHT ADJUSTMENT LOCK SYSTEM

BACKGROUND OF THE INVENTION

1. Field of the Invention

This invention relates generally to cleaning and maintenance devices, and more specifically to a height adjustment lock system for changing the length of a pole handle of a cleaning or maintenance device.

2. Description of Related Art

Many cleaning and maintenance devices are attached to handles or poles to facilitate the use and operation of the device. Oftentimes these poles or handles require length adjustment to best accommodate the user or a specific use of the device. While length adjustment can be accomplished by cutting the pole or handle to the desired length, this is not always practical as the device may be used by multiple people, all of whom may have a different length requirement. In addition, a given task may dictate a desired length, and it may be necessary to change the length of the pole or handle depending on the task that one is engaged in.

Devices that incorporate poles or handles can range from cleaning devices such as, but not limited to, brooms, mops, dusters, and squeegees to tools such as pruners, saws, light bulb changers, fish nets, and the like. Other devices such as ski poles, hiking poles, canes, and various other items could also benefit from an adjustable pole or handle.

What is needed is a device that, when used in conjunction with a pole or handle for a cleaning or maintenance device, allows one to easily adjust the height of the pole or handle to best fit the needs and size requirements of the user.

It is thus an object of the present invention to provide a height adjustment lock system.

These and other objects of the present invention are not to be considered comprehensive or exhaustive, but rather, exemplary of objects that may be ascertained after reading this specification and claims with the accompanying drawings.

BRIEF SUMMARY OF THE INVENTION

In accordance with the present invention, there is provided a height adjustment lock system comprising a braking cylinder for receiving an upper pole section and a lower pole section; the braking cylinder having a brake shoe retainer for receiving a brake shoe; the lower pole section capable of being slidably engaged within the braking cylinder; the brake shoe having a shape conformal to a surface of the lower pole section and a frictional surface capable of engaging with and retaining the lower pole section; a locking handle hingably coupled to the braking cylinder where the locking handle comprises a brake shoe pusher capable of applying force to the brake shoe when the locking handle is moved and further comprising a retainer for retaining the locking handle to the braking cylinder.

The foregoing paragraph has been provided by way of introduction, and is not intended to limit the scope of the invention as described in this specification, claims and the attached drawings.

BRIEF DESCRIPTION OF THE DRAWINGS

The invention will be described by reference to the following drawings, in which like numerals refer to like elements, and in which.

Figure 1:
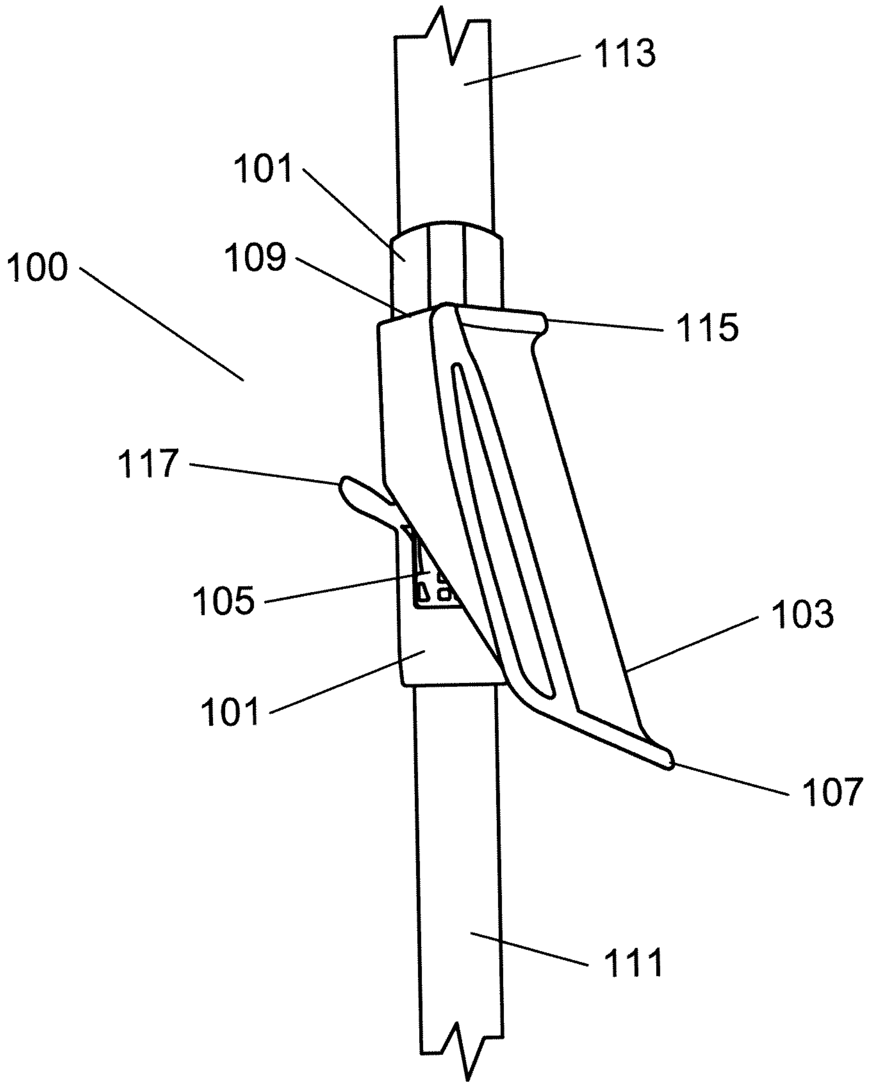
FIG. 1 is a plan view of the height adjustment lock system in an open position.

The attached figures depict various views of the Height Adjustment Lock System in sufficient detail to allow one skilled in the art to make and use the present invention. These figures are exemplary, and depict a preferred embodiment; however, it will be understood that there is no intent to limit the invention to the embodiment depicted herein. On the contrary, the intent is to cover all alternatives, modifications, and equivalents as may be included within the spirit and scope of the invention as defined by this specification, claims and drawings.

DESCRIPTION OF THE PREFERRED EMBODIMENTS

A Height Adjustment Lock System is described and depicted by way of this specification and the attached drawings and claims.

For a general understanding of the present invention, reference is made to the drawings. In the drawings, like reference numerals have been used throughout to designate identical elements.

The height adjustment lock system has a locking handle that is movably attached to a braking cylinder. A multi section pole or handle is engaged with the braking cylinder. There may be two or more sections, with the slideable interaction of a pair of sections being capable of incorporating a height adjustment lock system of the present invention. Movement of the locking handle in a closed or engaged position causes the braking cylinder to frictionally retain the sections in a given position, and further movement of the locking handle in an opposite open or disengaged position causes the braking cylinder to release the sections for further height or length adjustment.

Referring to FIG. 1, a plan view of the height adjustment lock system 100 in an open position is shown. The height adjustment lock system may be made from any suitable rigid or semi-rigid material, for example, a plastic. Examples of suitable plastics include acrylonitrile butadiene styrene (ABS), polyethylene, polypropylene, polystyrene, polyvinyl chloride, polytetrafluoroethylene, and the like. Bioplastics may also be used in some embodiments of the present invention. In addition, reinforced plastics, metals, wood, or other materials that may be suitably formed may also be used. The various components of the height adjustment lock system 100 may be made by injection molding, blow molding, machining, extruding, or the like.

The height adjustment lock system comprises a braking cylinder 101 for receiving an upper pole section 113 and a lower pole section 111. The braking cylinder 101 has at least one brake shoe retainer (not seen in FIG. 1, see FIG. 11) that retains a brake shoe 105. The brake shoe 105 has a shape that is conformal to a surface of the lower pole section 111 and further has a frictional surface that is capable of engaging with and retaining the lower pole section 111. The braking cylinder 101 may, in some embodiments of the present invention, have a handle 117 for ease of use. The lower pole section 111 is capable of being slidably engaged within the braking cylinder 101, and the upper pole section 113 being retained by the braking cylinder 101. A locking handle 103 is hingably coupled to the braking cylinder 101 where the locking handle 103 comprises a brake pad pusher (see FIG. 8) capable of applying force to the brake shoe when the locking handle is moved and further comprising a retainer for retaining the locking handle to the braking cylinder. In some embodiments of the present invention, the locking handle 103 has a flare 107 to facilitate ease of use. An upper hinge edge 109 provides a finite range of motion for the locking handle 103. In some embodiments of the present invention, an upper flange 115 is present. Each of these various components and their interaction will be further described herein.

Figure 2:
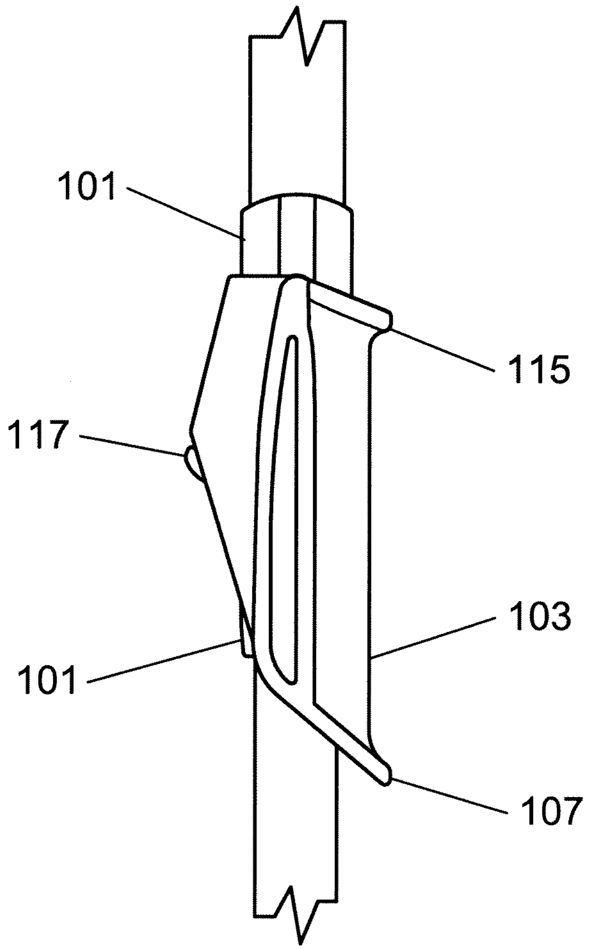
FIG. 2 is a plan view of the height adjustment lock system in a closed position.
Figure 3:
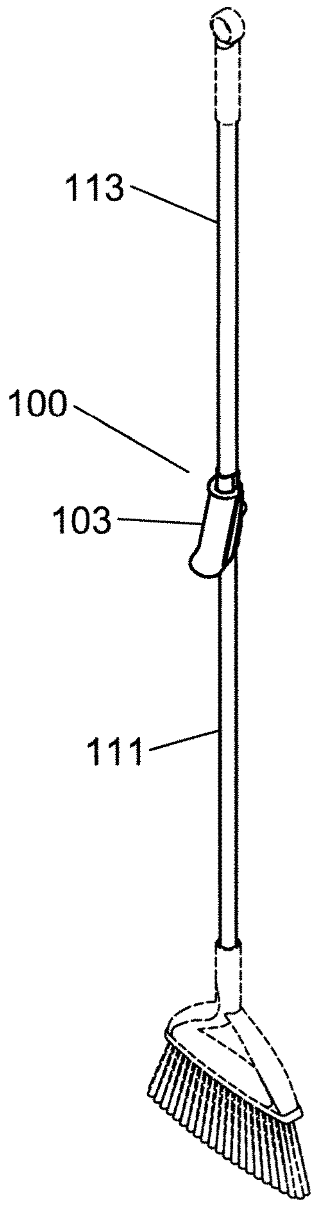
FIG. 3 is a perspective view of the height adjustment lock system in use.

While FIG. 1 depicted the height adjustment lock system in an open position where the brake shoes are not binding and retaining the lower pole section, FIG. 2 in the alternative depicts a plan view of the height adjustment lock system in a closed position where the brake shoes are binding and retaining the lower pole section, thus setting the height of the poles in a fixed position, ready for use. In use, the height adjustment lock system 100 will have the locking handle 103 in the closed or binding position. As an example of a possible use for the height adjustment lock system 100, FIG. 3 is an example of the height adjustment lock system 100 in use with a broom head.

Figure 4:
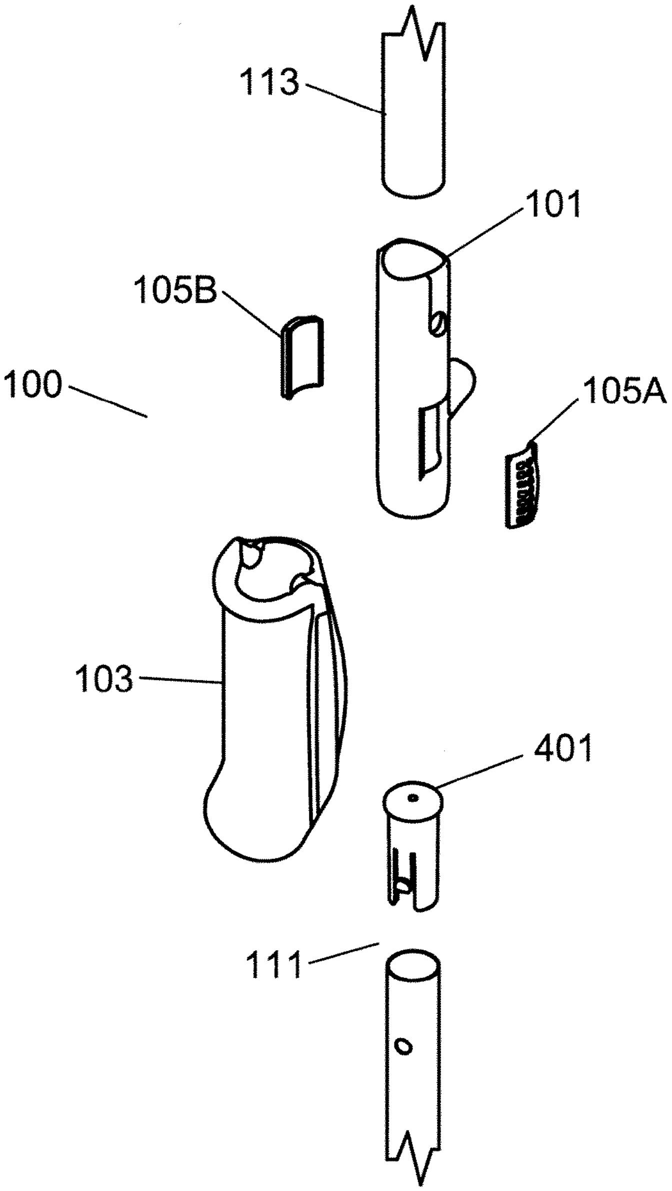
FIG. 4 is an exploded view of the height adjustment lock system.

FIG. 4 is an exploded view of the height adjustment lock system 100 showing its various components. The braking cylinder 101 can be seen with a first brake shoe 105A and a second brake shoe 105B. The upper pole section 113 fits in, and is secured by, the braking cylinder 101 by friction or with the addition of an adhesive, hardware or other features. The locking handle 103 can also be seen with the lower pole section 111 and a stop plug 401.

Figure 5:
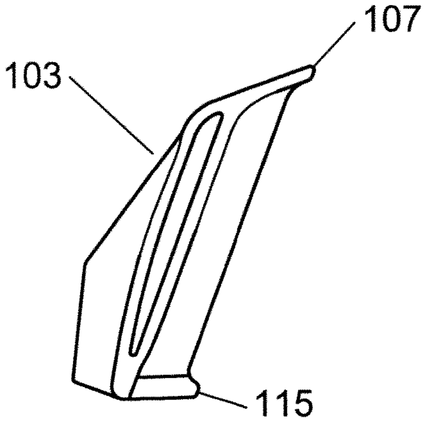
FIG. 5 is a side view of a locking handle of the height adjustment lock system.
Figure 6:
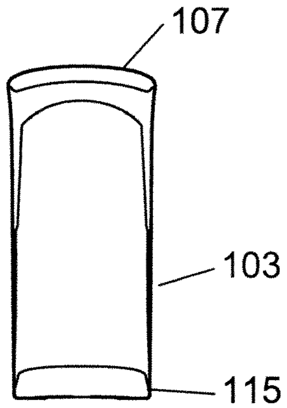
FIG. 6 is a side view of the locking handle of the height adjustment lock system.

FIG. 5 is a side view of a locking handle 103 of the height adjustment lock system. The locking handle 103 may be made from any suitable rigid or semi-rigid material, for example, a plastic. Examples of suitable plastics include acrylonitrile butadiene styrene (ABS), polyethylene, polypropylene, polystyrene, polyvinyl chloride, polytetrafluoroethylene, and the like. Bioplastics may also be used in some embodiments of the present invention. In addition, reinforced plastics, metals, wood, or other materials that may be suitably formed may also be used. The locking handle 103 may be made by injection molding, blow molding, machining, extruding, or the like. FIG. 6 is a side view of the locking handle of the height adjustment lock system. The locking handle 103 is generally cylindrical and capable of receiving the braking cylinder 101. The locking handle 103 may, in some embodiments of the present invention, have a varying diameter, with one end being larger than the other. An oblique or angled cutaway may be present to better accommodate opening and closing of the overall height adjustment lock system. A handle flare 107 may be provided to facilitate ease of operation. An upper flange 115 may also be present.

Figure 7:
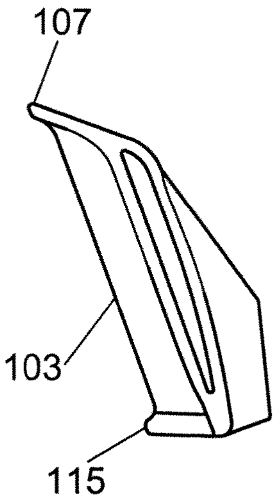
FIG. 7 is a rotated plan view of the locking handle of the height adjustment lock system.
Figure 8:
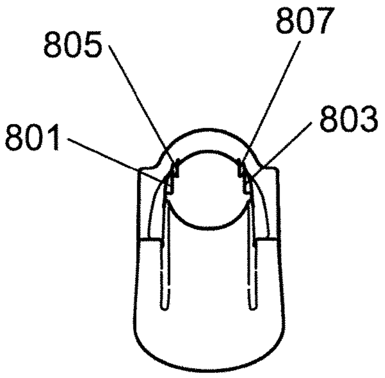
FIG. 8 is a bottom plan view of the locking handle of the height adjustment lock system.

FIG. 7 is a rotated plan view of the locking handle of the height adjustment lock system and FIG. 8 is a bottom plan view of the locking handle of the height adjustment lock system. Several inner features of the locking handle 103 can be seen. A first hinge pin 801 and a second hinge pin 803 are attached to, or integral with, the locking handle 103 and protrude inward in order to engage with mating openings or features on the braking cylinder 101. In some embodiments of the present invention, the hinge pins are generally circular or cylindrical to accommodate rotation and movement of the locking handle 103. Also seen in FIG. 8 is a first brake shoe pusher 805 and a second brake shoe pusher 807. The brake shoe pushers are attached to, or integral with, the locking handle 103 and protrude inward to engage with each brake shoe 105 and push that brake shoe inward to frictionally bind or retain the lower pole section 111 (see FIG. 1). Each brake shoe pusher may be a protrusion, finger or strut that rides along and provides pressure to the outer surface of each brake shoe 105 which in turn creates frictional binding of the brake shoe with the lower pole section 111, thus locking the pole sections in place.

Figure 9:
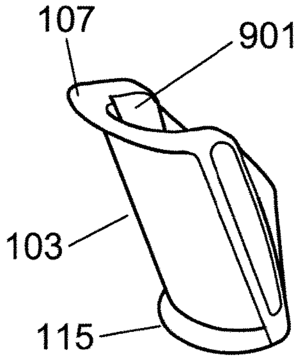
FIG. 9 is a perspective view of the locking handle of the height adjustment lock system.

FIG. 9 is a perspective view of the locking handle of the height adjustment lock system showing a first braking cylinder retainer 901. Such a retainer is a feature along the inner portion of the locking handle 103. This feature serves to grasp or otherwise retain the locking handle in a closed position with the braking cylinder 101 and may, in some embodiments of the present invention, be a groove or ridges that receive the braking cylinder 101 or a locking feature of the braking cylinder 101.

Figure 10:
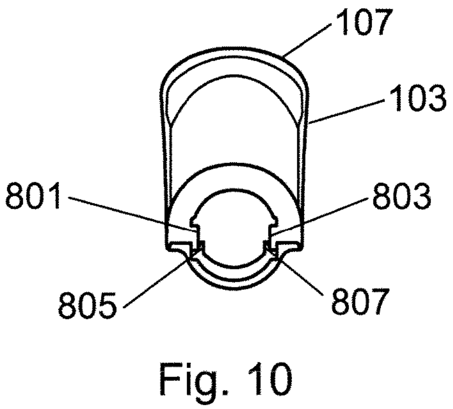
FIG. 10 is a top plan view of the locking handle of the height adjustment lock system.

FIG. 10 is a top plan view of the locking handle of the height adjustment lock system. The hinge pins and brake shoe pushers can be clearly seen.

Figure 11:
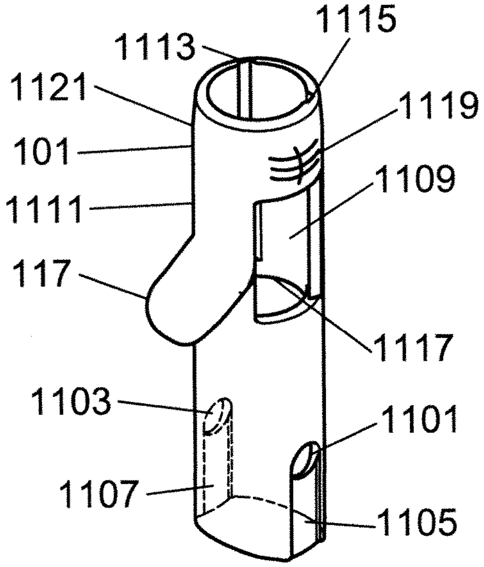
FIG. 11 is a perspective view of a braking cylinder of the height adjustment lock system.

FIG. 11 is a perspective view of a braking cylinder 101 of the height adjustment lock system. The braking cylinder 101 may be made from any suitable rigid or semi-rigid material, for example, a plastic. Examples of suitable plastics include acrylonitrile butadiene styrene (ABS), polyethylene, polypropylene, polystyrene, polyvinyl chloride, polytetrafluoroethylene, and the like. Bioplastics may also be used in some embodiments of the present invention. In addition, reinforced plastics, metals, wood, or other materials that may be suitably formed may also be used. The braking cylinder 101 may be made by injection molding, blow molding, machining, extruding, or the like.

Figure 12:
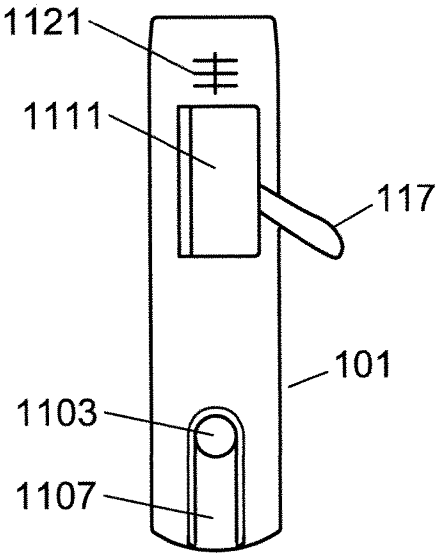
FIG. 12 is a side plan view of the braking cylinder of the height adjustment lock system.

In use, the braking cylinder 101 is coupled to the locking handle 103 with hinge pins and related receivers. FIG. 12 is a side plan view of the braking cylinder 101 of the height adjustment lock system 100. The braking cylinder 101 is generally cylindrical, and retains an upper pole section and allows a lower pole section to slide through the braking cylinder. A first hinge pin receiver 1101 and a second hinge pin receiver 1103 can be seen. Each hinge pin receiver is shaped to accommodate a related hinge pin of the locking handle 103 and may be, in some embodiments of the present invention, generally circular. A first hinge pin guide slot 1105 and a second hinge pin guide slot 1107 allow for ease of assembly and fitting of the braking cylinder 101 to the locking handle 103. A first brake shoe retainer 1109 and a second brake shoe retainer 1111 can be seen as openings on each side of the braking cylinder 101. In some embodiments of the present invention, the openings are generally rectangular, and may have angled, chamfered, beveled, channeled, or otherwise modified edges to ensure alignment and retention of a brake shoe such as the brake shoe depicted in FIGS. 17-23. A first slot 1115 and a second slot 1113 can also be seen along the inner surface of the braking cylinder 101. To prevent over-travel of the lower pole section 111 (see FIG. 1), a stop flange 1117 is located along the inner all of the braking cylinder 101. The stop flange 1117 may be a ridge, bevel, ring, or other structure that effectively changes the inner diameter of the braking cylinder 101 so that the lower pole section 111 with the stop plug 401 engaged will not pull out of the outer pole section or braking cylinder. A feature or features to engage with the braking cylinder retainer 901 of the locking handle 103 can also be seen as a first lock feature 1119 and a second lock feature 1121. Each lock feature is a protrusion from the braking cylinder 101 and may be curved or otherwise convex. In some embodiments of the present invention, each lock feature has raised lines that may intersect or otherwise cooperate one with the other.

Figure 13:
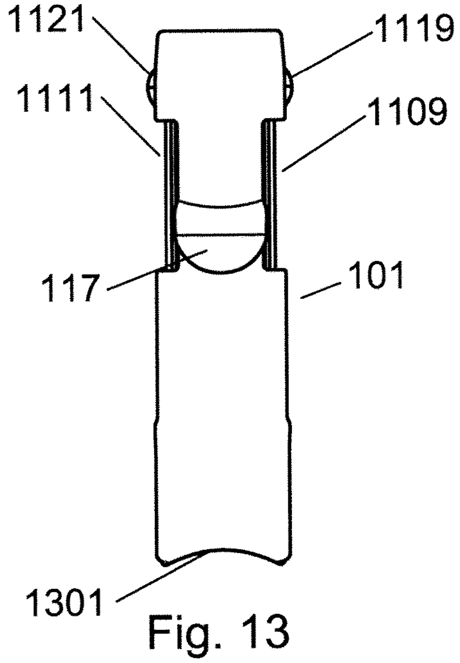
FIG. 13 is a rotated plan view of the braking cylinder of the height adjustment lock system.

FIG. 13 is a rotated plan view of the braking cylinder 101 of the height adjustment lock system 100. In some embodiments of the present invention, a parabolic or curved edge 1301 facilitates assembly of the upper pole section 113 (see FIG. 1) with the braking cylinder 101.

Figure 14:
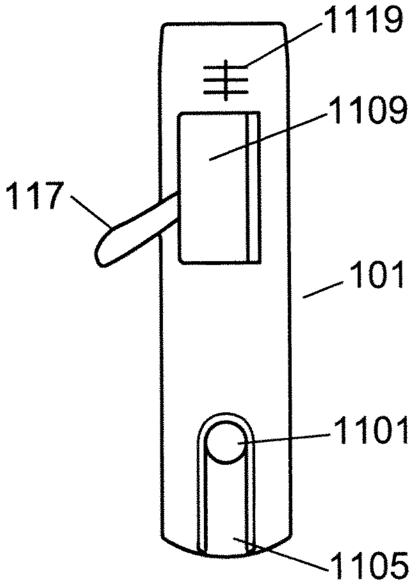
FIG. 14 is an opposing side plan view of the braking cylinder of the height adjustment lock system.

FIG. 14 is an opposing side plan view of the braking cylinder 101 of the height adjustment lock system 100 showing a beveled edge in the brake shoe retainer 1109.

Figure 15:
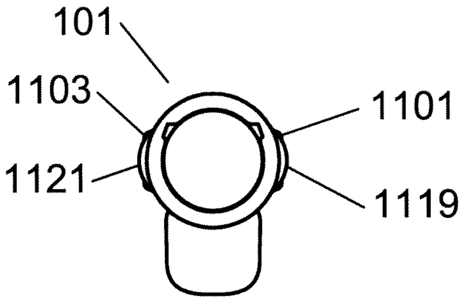
FIG. 15 is a bottom plan view of the braking cylinder of the height adjustment lock system.
Figure 16:
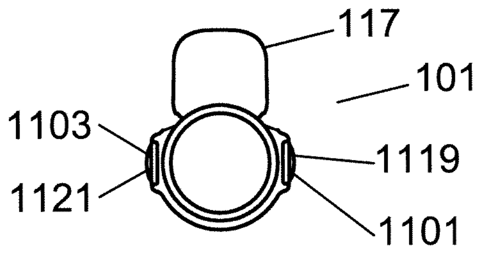
FIG. 16 is a top plan view of the braking cylinder of the height adjustment lock system.

FIG. 15 is a bottom plan view of the braking cylinder 101 of the height adjustment lock system 100 and FIG. 16 is a top plan view of the braking cylinder 101 of the height adjustment lock system 100.

For a complete understanding of the present invention, the brake shoe 105 will be further described by way of FIGS. 17-23. Two brake shoes will be described herein, however, one brake shoe or more than two brake shoes may also be employed. In the example provided herein, the brake shoe is generically referred to as 105, wherein the designator 105A and 105B are provided to describe a first brake shoe and a second brake shoe respectively.

Figure 17:
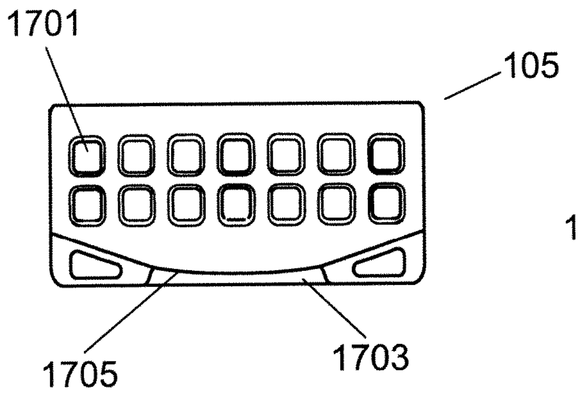
FIG. 17 is an outer plan view of a brake shoe of the height adjustment lock system.

FIG. 17 is an outer plan view of a brake shoe 105 of the height adjustment lock system 100. The brake shoe 105 may be made from any suitable rigid or semi-rigid material, for example, a plastic. Examples of suitable plastics include acrylonitrile butadiene styrene (ABS), polyethylene, polypropylene, polystyrene, polyvinyl chloride, polytetrafluoroethylene, and the like. Bioplastics may also be used in some embodiments of the present invention. In addition, reinforced plastics, metals, wood, or other materials that may be suitably formed may also be used. The brake shoe 105 may be made by injection molding, blow molding, machining, extruding, or the like.

The brake shoe 105 may have a recess or plurality of recesses 1701 that may be rectangular, square, circular, or the like. A step 1703 may be present on the outer surface of the brake shoe 105 to facilitate engagement with the brake shoe pusher of the locking handle and an edge 1705 may also be present. The overall shape of the brake shoe 105 may be, for example, rectangular or square in two dimensions and may have a curve that conforms to the curve of the lower pole section.

Figure 18:
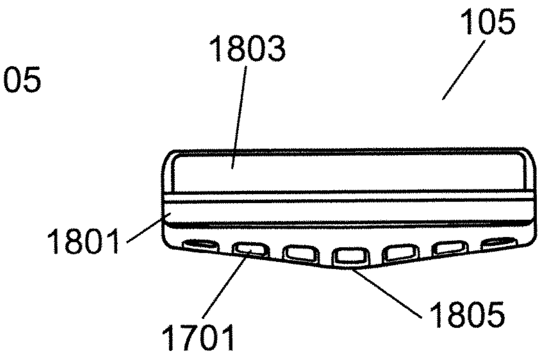
FIG. 18 is a side plan view of a brake shoe of the height adjustment lock system.

FIG. 18 is a side plan view of a brake shoe 105 of the height adjustment lock system 100. A groove 1801 can be seen that engages with an edge or bevel of the brake shoe retainer of the braking cylinder 101. Along the inner curved surface of the brake shoe that makes contact with the lower pole section, a frictional surface 1803 is present. While the frictional surface 1803 may simply be made from the same material as the brake shoe 105, an overlay or a friction altering overmolded material may be used. The frictional surface 1803 may be a soft durometer material and may be formed from an elastomeric material such as a thermoplastic elastomer, and may be attached to the brake shoe 105, using bonding techniques such as chemical bonding, thermal bonding, mechanical bonding, or other such techniques that are known to those skilled in the art. The frictional surface 1803 may also be attached to the brake shoe 105 through a coinjection molding process, such as the coinjection molding process described in U.S. Pat. No. 6,562,276 entitled "Process for Forming a Multilayer, Coinjected Article", the entire disclosure of which is incorporated by reference herein. The outer surface of the brake shoe 105 may also, in some embodiments of the present invention, be formed as an apex 1805 as seen in FIG. 18.

Figure 19:
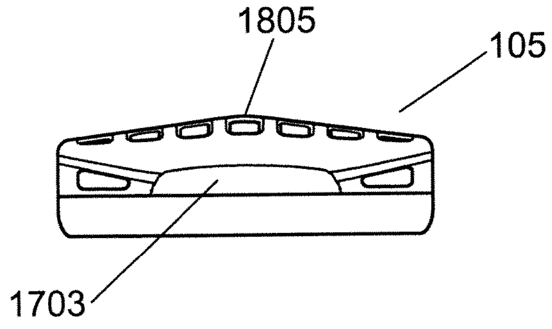
FIG. 19 is a rotated side plan view of a brake shoe of the height adjustment lock system.
Figure 20:
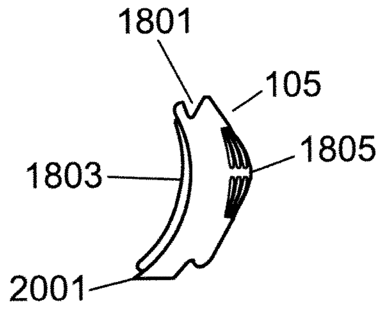
FIG. 20 is an end plan view of a brake shoe of the height adjustment lock system.
Figure 21:
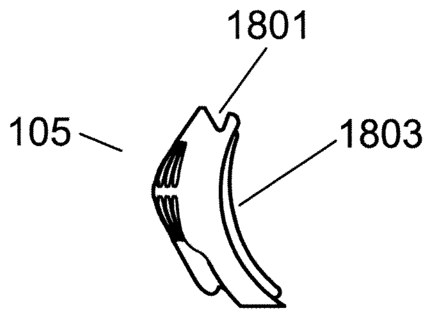
FIG. 21 is an opposing end plan view of a brake shoe of the height adjustment lock system.

FIG. 19 is a rotated side plan view of a brake shoe of the height adjustment lock system and FIG. 20 is an end plan view of a brake shoe of the height adjustment lock system. FIG. 21 is an opposing end plan view of a brake shoe of the height adjustment lock system that clearly shows a retention groove 1801 for engaging with a mating feature on the corresponding brake shoe retainer.

Figure 22:
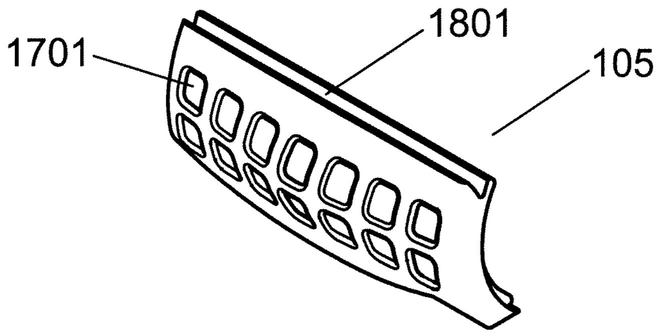
FIG. 22 is an outer perspective view of a brake shoe of the height adjustment lock system.
Figure 23:
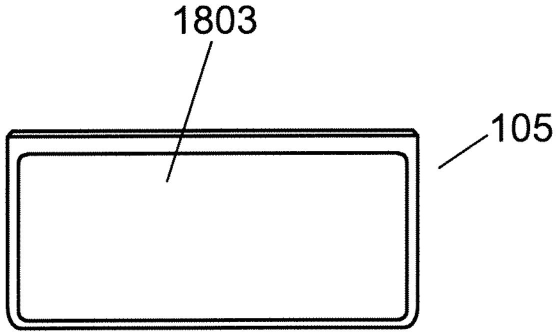
FIG. 23 is an inner perspective view of a brake shoe of the height adjustment lock system.

FIG. 22 is an outer perspective view of a brake shoe of the height adjustment lock system and FIG. 23 is an inner perspective view of a brake shoe of the height adjustment lock system that shows the frictional surface 1803 that binds with the lower pole section 111 (see FIG. 1).

Figure 24:
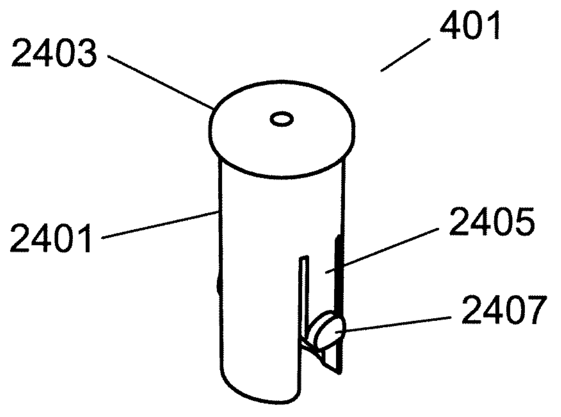
FIG. 24 is a perspective view of a stop plug of the height adjustment lock system.

Lastly, FIG. 24 is a perspective view of a stop plug 401 of the height adjustment lock system. The stop plug 401 attaches to the lower pole section 111 and retains the lower pole section 111 within the braking cylinder 101 using the stop flange 1117 of FIG. 11. The plug body 2401 has a flange 2403 and a pin 2407 attached to or molded with a live hinge 2405. There may be two pins and related live hinges that each insert into a hole in the wall of the lower pole section 111 as seen in FIG. 4.

The stop plug 401 may be made from any suitable rigid or semi-rigid material, for example, a plastic. Examples of suitable plastics include acrylonitrile butadiene styrene (ABS), polyethylene, polypropylene, polystyrene, polyvinyl chloride, polytetrafluoroethylene, and the like. Bioplastics may also be used in some embodiments of the present invention. In addition, reinforced plastics, metals, wood, or other materials that may be suitably formed may also be used. The stop plug 401 may be made by injection molding, blow molding, machining, extruding, or the like.

Other configurations, orientations, arrangements, as well as various sizes and geometries are considered to be within the scope and content of the present invention.

Modifications, additions, or deletions may be made, and are considered to be within the spirit and broad scope of the present invention and the various embodiments described and envisioned herein.

It is, therefore, apparent that there has been provided, in accordance with the various objects of the present invention, a height adjustment lock system. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims and the attached drawings.

What is claimed is:

1. A height adjustment lock system comprising:

a braking cylinder for receiving an upper pole section and a lower pole section;

the braking cylinder having a brake shoe retainer for receiving a brake shoe;

the lower pole section capable of being slidably engaged within the braking cylinder;

the brake shoe having a shape conformal to a surface of the lower pole section and a frictional surface capable of engaging with and retaining the lower pole section;

a locking handle having a generally cylindrical inner surface, the locking handle cylindrically disposed about and hingeably coupled to the braking cylinder where the locking handle comprises a brake shoe pusher that protrudes inward from the generally cylindrical inner surface and is capable of applying force to the brake shoe when the locking handle is moved downward toward the lower pole section, and further comprising a retainer on the generally cylindrical inner surface for retaining the locking handle to the braking cylinder.

2. The height adjustment lock system of claim 1, wherein the braking cylinder further comprises a second brake shoe retainer.

3. The height adjustment lock system of claim 2, further comprising a second brake shoe received by the second brake shoe retainer.

4. The height adjustment lock system of claim 1, wherein the braking cylinder further comprises a handle.

5. The height adjustment lock system of claim 1, wherein the braking cylinder further comprises a lock feature for engaging with and retaining the locking handle.

6. The height adjustment lock system of claim 5, wherein the braking cylinder further comprises a second lock feature for engaging with and retaining the locking handle.

7. The height adjustment lock system of claim 1, wherein the locking handle further comprises a second brake pad pusher.

8. The height adjustment lock system of claim 1, further comprising a stop plug capable of coupling to the lower pole section.

9. The height adjustment lock system of claim 8, wherein the stop plug is capable of being retained in the lower pole section by a pin.

10. The height adjustment lock system of claim 1, wherein the braking cylinder further comprises a stop flange for halting the linear travel of the lower pole section into the braking cylinder.

11. The height adjustment lock system of claim 1, wherein the frictional surface of the brake shoe comprises a soft durometer material.

12. A height adjustable cleaning device comprising:

a pole comprising a lower pole section and an upper pole section;

a cleaning head attached to the lower pole section;

a braking cylinder for receiving the upper pole section and the lower pole section;

the braking cylinder having a brake shoe retainer for receiving a brake shoe;

the lower pole section slidably engaged within the braking cylinder;

the brake shoe having a shape conformal to a surface of the lower pole section and a frictional surface to engage with and retain the lower pole section;

a locking handle having a generally cylindrical inner surface, the locking handle cylindrically disposed about and hingeably coupled to the braking cylinder where the locking handle comprises a brake shoe pusher that protrudes inward from the generally cylindrical inner surface and is capable of applying force to the brake shoe when the locking handle is moved downward toward the lower pole section, and further comprising a retainer on the generally cylindrical inner surface for retaining the locking handle to the braking cylinder.

13. The height adjustable cleaning device of claim 12, wherein the braking cylinder further comprises a second brake shoe retainer.

14. The height adjustable cleaning device of claim 13, further comprising a second brake shoe received by the second brake shoe retainer.

15. The height adjustable cleaning device of claim 12, wherein the frictional surface of the brake shoe comprises a soft durometer material.

16. The height adjustable cleaning device of claim 12, wherein the braking cylinder further comprises a lock feature for engaging with and retaining the locking handle.

17. The height adjustable cleaning device of claim 16, wherein the braking cylinder further comprises a second lock feature for engaging with and retaining the locking handle.

18. The height adjustable cleaning device of claim 12 wherein the locking handle further comprises a second brake pad pusher.

19. The height adjustable cleaning device of claim 12, further comprising a stop plug coupled to the lower pole section.

20. The height adjustable cleaning device of claim 12, wherein the braking cylinder further comprises a stop flange for halting the linear travel of the lower pole section into the braking cylinder.

* * * * *